United States Patent [19]

Blanchard et al.

[11] Patent Number: 4,492,770

[45] Date of Patent: Jan. 8, 1985

[54] CATALYST AND USE THEREOF IN TREATING INTERNAL COMBUSTION ENGINE EXHAUST GASES

[75] Inventors: Gilbert Blanchard, Le Plessis Belleville; Jean-Pierre Brunelle, Saint-Brice Sous Foret; Michel Prigent, Rueil-Malmaison, all of France

[73] Assignee: Procatalyse, Rueil-Malmaison, France

[21] Appl. No.: 330,007

[22] Filed: Dec. 11, 1981

[30] Foreign Application Priority Data

Dec. 17, 1980 [FR] France .................. 80 26749

[51] Int. Cl.$^3$ .................. B01J 23/10; B01J 23/42; B01J 23/44; B01J 23/72
[52] U.S. Cl. .................. 502/304; 502/245; 502/316; 502/324; 502/326; 502/327; 423/213.5
[58] Field of Search .................. 252/460, 462, 466 B, 252/470, 471, 474, 455 R; 423/213.5; 502/245, 304, 316, 324, 326, 327

[56] References Cited

U.S. PATENT DOCUMENTS

| | | | |
|---|---|---|---|
| 3,271,324 | 9/1966 | Stephens et al. | 423/213.5 |
| 4,274,981 | 6/1981 | Suzuki et al. | 252/462 X |
| 4,378,307 | 3/1983 | Brunelle et al. | 252/462 X |

FOREIGN PATENT DOCUMENTS 0027069  4/1981  European Pat. Off. .......... 252/462

*Primary Examiner*—W. J. Shine
*Attorney, Agent, or Firm*—Burns, Doane, Swecker & Mathis

[57] ABSTRACT

Provided is an improved catalyst and a process employing same in the treatment of exhaust gases generated by internal combustion engines. The catalyst comprises a support and an active phase comprising copper, cerium and/or iron, at least one metal selected from the group consisting of platinum and palladium, and at least one metal selected from the group consisting of iridium and rhodium. The catalyst is particularly active in the removal of carbon monoxide, unburned hydrocarbons and nitrogen oxides generally present in the exhaust gases of an internal combustion engine.

17 Claims, No Drawings

CATALYST AND USE THEREOF IN TREATING INTERNAL COMBUSTION ENGINE EXHAUST GASES

BACKGROUND OF THE INVENTION

1. Field of the Invention

The present invention relates to three-way catalysts which are particularly effective in treating the exhaust gases of internal combustion engines. The present invention also relates to the use of such catalysts in the treatment of internal combustion engine exhaust gases.

The expression "three-way catalysts" for the purposes of the present invention is taken as meaning catalysts which effect the oxidation, in particular, of the carbon monoxide and hydrocarbons present in internal combustion engine exhaust gases, and also the simultaneous reduction, in particular, of the nitrogen oxides present in such gases.

2. Description of the Prior Art

In gasoline fueled internal combustion engines, the composition of the exhaust gases generated thereby can be adjusted to attain a stoichiometric equilibrium such that the catalytic oxidation and reduction of its various constituents result in water, carbon dioxide and nitrogen. The methods generally used for adjusting the composition of the exhaust gas in order to achieve this stoichiometry include, in particular, the continuous adjustment of the air/fuel ratio at the engine intake, and/or the introduction of additional oxygen upstream of the catalyst. The composition of the exhaust gas can thus be varied within seconds from a composition containing a relative excess of oxidizing compounds (a so-called "lean" adjustment) to a composition containing an excess of reducing compounds (a so-called "rich" adjustment), and vice versa.

In particular, the so-called "lean" adjustment is such that the amounts of oxygen and nitrogen oxide present are greater than those required to oxidize the carbon monoxide, hydrocarbons and hydrogen present. Conversely, the so-called "rich" adjustment is such that the amounts of carbon monoxide, hydrocarbons and hydrogen present are greater than those required to reduce the oxygen and nitrogen oxides present.

Catalysts for the treatment of exhaust gases have been proposed. For example, in the *Journal of Catalysis*, Vol. 56, 321 (1979) and the 6th North American Congress of the Catalysis Society—Chicago—March 1979—Communication H4, three-way catalysts are disclosed which contain cerium oxide and precious metals as the active phase.

Japanese Application No. J53,062-777 published the 28th week of 1977, discloses three-way catalysts which employ iron oxide and precious metals as the active phase.

Japanese Application No. 76/49,190 J51, 049-190 published the 24th week of 1976 discloses three-way catalysts which use lanthanum, barium, copper, rhodium, platinum and/or palladium in the active phase.

Japanese Application No. 74/23,790 J49, 023-790 published the 39th week of 1974 discloses three-way catalysts which contain ruthenium, palladium and, if appropriate, a metal chosen from among Nb, Ce, Ti, Fe, Ni and Cu, as the active phase.

Such catalysts, however, prove to have an inadequate initial activity and an inadequate stability over time to satisfy the current anti-pollution requirements.

Accordingly, it is an object of the present invention to provide a novel and improved catalyst which is active in the treatment of internal combustion engine exhaust gases.

It is another object of the present invention to provide a catalyst which exhibits an improved initial activity in the treatment of internal combustion engine exhaust gases.

It is still another object of the present invention to provide a stable catalyst for the treatment of internal combustion engine exhaust gases.

Yet another object of the present invention is to provide a process for the treatment of internal combustion engine exhaust gases which utilizes a catalyst of improved initial activity and stability.

These and other objects, as well as the scope, nature and utilization of the invention, will be apparent to those skilled in the art from the following description and the appended claims.

SUMMARY OF THE INVENTION

The catalyst support employed in the catalyst of the present invention is generally based upon a refractory oxide comprised of, for example, silica, alumina, alumina-silicates or mixed oxides comprising, for example, alumina associated with silica, zirconium oxide, cerium oxide and/or titanium oxide.

In a preferred embodiment of the present invention, a support based on alumina particles is used. Such preferred supports preferably have a specific surface area of between 25 and 250 m$^2$/g and most preferably between 70 and 150 m$^2$/g. It is preferred that the supports also have a total pore volume of between 0.5 and 2 cm$^3$/g and most preferably between 0.8 and 1.7 cm$^3$/g. The supports preferably possess a macroporosity such that the pore volume of pores having a diameter greater than 1,000 Å is between about 0.05 and 0.6 cm$^3$/g, and most preferably between 0.2 and 0.5 cm$^3$/g.

Such supports can be readily manufactured from the active alumina obtained in accordance with the process described in U.S. Pat. No. 2,915,365, which is agglomerated in accordance with the process described in U.S. Pat. No. 2,881,051.

The supports can also be manufactured by autoclaving the aforementioned agglomerates in a neutral or acid medium, and then drying and calcinating same, for example, as described in French Pat. Nos. 1,449,904 and 1,386,364.

Suitable supports may also be obtained in accordance with the process described in French Patent Application No. 77/23,880, now published as French Pat. No. 2,399,276.

Such alumina supports may also be manufactured in accordance with the process described in European patent application No. 15,801 assigned to Rhone-Poulenc Industries.

Supports based on alumina particles in accordance with the present invention may also be treated, as is well known to those skilled in the art, with pore-forming agents, e.g., such as those based on cellulose, naphthalene, natural gums, synthetic polymers and the like, in order to achieve a desired porosity.

The support employed may also comprise a metal or ceramic substrate coated with one or more refractory oxides, with the substrate preferably being in the form of an inert and rigid honeycomb structure containing channels or ducts. Such supports are well known to those skilled in the art and have been widely described in the literature, with the refractory oxides employed preferably being in the form of a film or coating applied to the substrate.

The refractory oxides preferably employed in the coating are selected from the group consisting of the oxides of aluminum, magnesium, calcium, strontium, barium, scandium, yttrium, the lanthanides, gallium, silicon, titanium, zirconium, hafnium, thorium, niobium, tantalum, chromium, molybdenum and tungsten. An aluminum oxide coating is most preferred.

The metal substrates are preferably made from alloys of iron, nickel and chromium, or from iron, chromium, aluminum and cobalt, e.g., such as those designated by the trademark KANTHAL, or from alloys of iron, chromium, aluminum and yttrium such as those designated by the trademark FECRALLOY. The metal substrate can also comprise carbon steel or simple pig iron.

Aluminum-based metal substrates can advantageously be pretreated by heating same in an oxidizing atmosphere under conditions of time and temperature sufficient to form a surface layer of aluminum oxide thereon from the aluminum contained in the alloy. In the case of carbon steels or pig iron, metal substrates thereof can also be pretreated by annealing the iron or steel when coated with a layer of aluminum in order to thereby obtain an aluminum/iron diffusion layer coating.

Among the ceramic substrates which may be used are preferably those comprised of one of the following as the major component: cordierite, alumina, mullite, zirconia, zirconium mullite, barium, titanate, porcelain, thorium oxide, magnesium oxide, steatite or the carbides of boron or silicon.

In a preferred embodiment of the present invention, the aluminum oxide coating on the ceramic or metal substrates is achieved upon the application of alumina hydrate thereto followed by calcination, or, upon the deposition of an aluminum salt to the substrate followed by calcination, or, upon the application of a layer of active alumina to the substrate followed by calcination.

The honeycomb cellular structure of the substrate can be hexagonal, tetragonal, triangular or corrugated in shape. The cellular structure is such as to allow gas to pass through its channels or ducts, which are formed during its manufacture by a process of extrusion, rolling, solidification of elements in sheet form, or the like.

The supports employed may also be advantageously treated so as to render them heat stable. These treatments, which are well known to those skilled in the art, particularly involve stabilizing the alumina particle or the aluminum oxide coating by means of an alkaline earth metal, silica and/or rare earth compound.

The stabilized supports described in French Pat. Nos. 2,257,335 and 2,290,950, assigned to Rhone-Poulenc Industries, exemplify suitable supports for the purposes of the present invention.

The amount of platinum and palladium metal employed in the catalyst generally varies in the range of from about 0.04 to 0.5% by weight, relative to the support, and most preferably from about 0.05 to 0.15% by weight of the support. The amount of iridium and rhodium metal employed generally varies from about 0.002 to 0.1% by weight of the support and most preferably from about 0.005 to 0.02% by weight. A preferred catalyst of the present invention comprises rhodium in association with platinum and/or palladium.

The total amount of cerium and/or iron in the active phase of the catalyst is generally in the range of from about 0.1 to about 10% by weight relative to the support. This proportion is preferably in the range of from about 0.3 to 4.5% by weight of the support.

The amount of copper employed in the active phase of the catalyst is preferably in the range of from about 0.1 to about 4% by weight of the support, and most preferably in the range of from about 0.1 to about 2% by weight of the support.

The total amount of copper and iron and/or cerium in the active phase of the catalyst must be less than 14% by weight and is preferably less than 4.9% by weight relative to the support.

The catalysts of the present invention can also contain at least one of the following metals: tungsten, nickel, manganese, tin, germanium, cobalt, uranium and rhenium. When employed, the total amount of the aforegoing metals is generally in the range of from about 0.2 to about 5% by weight of the support.

The catalysts of the present invention can be prepared in accordance with conventional methods, e.g., either by impregnating the support or by introducing the metals of the active phase to the support during its manufacture.

The preferred procedure is to impregnate the support with solutions of inorganic or organic compounds of the desired metals. The impregnation can be carried out with solutions containing all the various metals, with which the support is to be impregnated, or successively with different solutions.

In a preferred embodiment, a support is impregnated successively with a solution containing compounds of iron, cerium and copper, and then with one or more solutions containing compounds of the precious metals with which the support is desired to be impregnated.

Illustrative of suitable compounds of copper, iron and cerium which can be used in the catalysts of the present invention include the following: salts of copper, iron and cerium, and more particularly cupric chloride, cupric nitrate, ferric nitrate, ammoniacal iron citrate, ferric chloride, cerous nitrate, cerous acetate, cerous chloride and ammoniacal ceric nitrate.

Illustrative of suitable compounds of rhodium, platinum and palladium which can be used are the following compounds: hydrated rhodium trichloride, chloroplatinic acid, palladium choride, palladium nitrate and also chloropentamminerhodium (III) dichloride, tetrammineplatinum (II) dichloride and tetramminepalladium (II) dichloride.

If a support based on a refractory oxide, and in particular on aluminum oxide, is used, the depth of impregnation can advantageously be adjusted by using conventional methods which are well known to those skilled in the art, e.g., by adding a certain amount of mineral or organic acid to the solution of precious metals. Nitric, hydrochloric and hydrofluoric acids, as well as acetic, citric and oxalic acids, are commonly used.

After impregnation of the support, the catalyst is dried and then activated in an air stream at a temperature between about 300 and 800° C. for a few hours.

The activation of the catalyst can also be advantageously carried out in a reducing atmosphere at a temperature between about 200° and 700° C.; with hydrogen, carbon monoxide and/or hydrogen sulphide being exemplary of suitable reducing agents.

If a support is used which comprises a metal or ceramic substrate coated with alumina, it is advantageous to bring the substrate into contact with an aqueous dispersion of an alumina precursor, which additionally contains copper and iron and/or cerium salts or oxides. The contacted substrate is then dried and calcined at a temperature of about 300° to 700° C., with the steps being repeated if appropriate. The desired precious metals are then introduced and the preparation of the catalyst is completed in the aforedescribed manner.

It has surprisingly been found that the catalysts of the present invention can be used to most effectively remove the major part of the carbon monoxide, unburned hydrocarbons and nitrogen oxides present in the exhaust gases generated by an internal combustion engine. Furthermore, it has been found that the catalysts possess a remarkable stability over time. Thus, the use of the subject catalysts in a process for treating exhaust gases of an internal combustion engine provides a most effective and efficient process.

The following examples are given as specific illustrations of the invention. It should be understood, however, that the specific details set forth in the examples are merely illustrative and in nowise limitative. All parts and percentages in the examples and the remainder of the specification are by weight unless otherwise specified.

EXAMPLE 1

A catalyst A in accordance with the present invention was prepared as follows:

100 g of alumina beads of the gamma structure were prepared in accordance with the processes described in French Pat. Nos. 1,449,904 and 1,386,364, i.e., by the autoclaving of agglomerates of active alumina in the presence of acid, and then drying and calcining. The alumina beads prepared had a specific surface area of about 100 m$^2$/g, a total pore volume of 0.90 cm$^3$/g and a pore volume of 0.40 cm$^3$/g of macropores having a diameter greater than 1,000 A.

These beads were impregnated with 90 cm$^3$ of an aqueous solution of cupric nitrate and cerous nitrate containing 0.8 g of copper and 4.0 g of cerium. After a contact time of 30 minutes, the beads were dried at 150° C. and calcined in air at 400° C. for 3 hours. They were then impregnated with 90 cm$^3$ of a solution of chloroplatinic acid and hydrated rhodium trichloride containing 73 mg of platinum and 7.3 mg of rhodium. After a contact time of 30 minutes, the beads were dried at 150° C. and then activated at 400° C. for 3 hours in a stream of hydrogen being circulated at 200 liters per hour.

The catalyst A prepared in this manner contained 0.073% by weight of platinum, 0.0073% by weight of rhodium, 0.8% by weight of copper and 4.0% by weight of cerium, relative to the support.

EXAMPLE 2

A catalyst B in accordance with the present invention was prepared as follows:

100 g of alumina beads were prepared in accordance with the process described in French patent application No. 79/04,810. These beads had a specific surface area of about 100 m$^2$/g, a total pore volume of about 1.20 cm$^3$/g and a pore volume of 0.45 cm$^3$/g of macropores having a diameter greater than 1,000 A.

A procedure for impregnation of the alumina support similar to that described in Example 1 was employed. However, in the present example, 120 cm$^3$ of an aqueous solution of ferric nitrate and cupric nitrate containing 2 g of iron and 1.0 g of copper, and than 120 cm$^3$ of a solution of chloroplatinic acid, palladium chloride and hydrated rhodium trichloride containing 73 mg of platinum, 29.2 mg of palladium and 7.3 mg of rhodium were used.

The catalyst B prepared in this manner contained 0.073% by weight of platinum, 0.0292% by weight of palladium, 0.0073% by weight of rhodium, 2% by weight of iron and 1% by weight of copper, relative to the weight of the support.

EXAMPLE 3

A catalyst C in accordance with the present invention was prepared as follows:

100 g of alumina beads were prepared in accordance with the process employed in Example 2. Furthermore, the alumina support was advantageously treated in order to improve its heat stability over time. The support was stabilized by 3% by weight lanthanum in accordance with the procedures described in French Pat. Nos. 2,257,335 and 2,290,950.

The procedure employed for the impregnation of the alumina support was that described in Example 2, except that the alumina beads were impregnated with 120 cm$^3$ of an aqueous solution of cupric nitrate, ferric nitrate and cerous nitrate containing 0.5 g of copper, 1.0 g of iron and 3.3 g of cerium.

After a contact time of about 30 minutes, the beads were dried at 150° C. and then calcined in air at 400° C. for 3 hours. They were then impregnated with 120 cm$^3$ of a solution of chloroplatinic acid and hydrated rhodium trichloride containing 73 mg of platinum and 7.3 mg of rhodium. After a contact time of 30 minutes, the beads were dried at 150° C. and then activated at 400° C. for 3 hours in a gas stream of 5% carbon monoxide in nitrogen flowing at 200 liters per hour.

The catalyst C prepared in the aforegoing manner contained 0.073% by weight of platinum, 0.0073% by weight of rhodium, 0.5% by weight of copper, 1.0% by weight of iron and 3.3% by weight of cerium, relative to the support.

EXAMPLE 4

A catalyst D in accordance with the present invention was prepared as follows:

100 g of alumina beads as described in Example 2 were impregnated with 120 cm$^3$ of an aqueous solution of cupric nitrate and cerous nitrate, same containing 0.8 g of copper and 4.0 g of cerium.

After a contact time of about 30 minutes, the beads were dried at 150° C. and then calcined in air at 400° C. for 3 hours. They were then impregnated with 120 cm$^3$ of a solution of chloroplatinic acid and hydrated rhodium trichloride, same containing 73 mg of platinum and 7.3 mg of rhodium. After a contact time therewith of 30 minutes, the beads were dried at 150° C. and then activated at 400° C. for 3 hours in a gas stream of 5% carbon monoxide in nitrogen circulated at 200 liters per hour.

The catalyst D prepared contained, by weight of the support, 0.073% platinum, 0.0073% rhodium, 0.8% copper and 4.0% cerium.

EXAMPLE 5

A catalyst E in accordance with the present invention was prepared as follows:

An aqueous suspension of alumina suitable for coating a monolithic honeycomb ceramic structure was prepared, which contained 30% by weight of alumina. A 100 g monolith was immersed in the suspension, which had a pH of 3.5. The support was then drained and dried so that the channels in the honeycomb structure were devoid of fluid, and was then calcined at 600° C. for 3 hours.

The coated monolith was immersed in an aqueous solution of cupric nitrate and cerium nitrate for about 30 minutes and was then drained and dried at 150° C. and calcined at 400° C. for 3 hours. The concentrations of cupric nitrate and cerium nitrate in the solution were such that, after immersion and calcination, the monolith support contained 0.5% by weight of copper and 4% by weight of cerium.

The support substrate was then impregnated by soaking same in an aqueous solution of chloroplatinic acid and hydrated rhodium trichloride. The concentrations of chloroplatinic acid and hydrated rhodium trichloride were such that the 100 g monolith was impregnated with 73 mg of platinum and 7.3 mg of rhodium. After a contact time of 30 minutes, the monolith was drained and dried at 150° C. and then activated at 400° C. for 3 hours in a hydrogen gas stream circulated at 200 liters per hour.

The catalyst prepared contained 0.073% by weight of platinum, 0.0073% by weight of rhodium, 0.5% by weight of copper and 4% by weight of cerium, all relative to the support.

EXAMPLE 6

A catalyst F in accordance with the present invention was prepared as follows:

100 g of alumina beads containing 2% neodymium were impregnated as described in Example 3. The procedure used for the impregnation was that described in Example 3, with the exception that a first impregnating solution containing 0.4 g of copper and 2 g of cerium was used.

The catalyst F prepared in this manner contained 0.073% by weight of platinum, 0.0073% by weight of rhodium, 0.4% by weight of copper, 2% by weight of cerium and 2% by weight of neodymium, relative to the support.

EXAMPLE 7

A catalyst G in accordance with the present invention was prepared as follows:

100 g of the alumina beads described in Example 1 were impregnated with 90 cm$^3$ of an aqueous solution of cupric nitrate, cerium nitrate and manganese nitrate, containing 0.8 g of copper, 4 g of cerium and 1 g of manganese. After a contact time of 30 minutes, the beads were dried at 150° C. and then calcined in air at 400° C. for 3 hours.

They were then impregnated with 90 cm$^3$ of a solution of chloroplatinic acid, palladium chloride and hydrated rhodium trichloride, the solution containing 73 mg of platinum, 29.2 mg of palladium and 7.3 mg of rhodium. After a contact time of 30 minutes, the beads were dried at 150° C. and then activated at 400° C. for 3 hours in a hydrogen gas stream flowing at 200 liters per hour.

The catalyst G which was prepared comprised 0.073% by weight of platinum, 0.0292% by weight of palladium, 0.0073% by weight of rhodium, 0.8% by weight of copper, 4% by weight of cerium and 1% by weight of manganese, the percentages by weight being relative to the support.

EXAMPLE 8

A catalyst H in accordance with the present invention was prepared as follows:

An aqueous suspension of alumina suitable for coating a monolithic metal structure designated by the trademark FECRALLOY was prepared. The procedure used for impregnating the metal substrate was that described in Example 5, except that an aqueous solution of cupric nitrate and cerium nitrate was used, the concentrations of which were such that, after immersion and calcination, the monolith contained 0.8% by weight of copper and 4% by weight of cerium. The substrate was then impregnated by soaking same in an aqueous solution of chloroplatinic acid and hydrated rhodium trichloride.

The catalyst H prepared thereby contained 0.073% by weight of platinum, 0.073% by weight of rhodium, 0.8% by weight of copper and 4% by weight of cerium, relative to the support.

EXAMPLE 9

A catalyst I in accordance with the prior art was prepared as follows:

100 g of beads of active alumina having a specific surface area of 250 m$^2$/g and a total pore volume of 0.55 cm$^3$/g were impregnated with 55 cm$^3$ of a cerium nitrate solution containing 5.0 g of cerium. After a contact time of 30 minutes, the beads were dried at 150° C. and then calcined in air at 400° C. for 3 hours.

The beads were then impregnated with 55 cm$^3$ of a solution of chloroplatinic acid and hydrated rhodium trichloride containing 73 mg of platinum and 7.3 mg of rhodium. After a contact time of 30 minutes, the beads were dried at 150° C. and then activated at 400° C. for 3 hours in a hydrogen gas stream circulating at 200 liters per hour.

The catalyst I prepared contained by weight relative to the support, 0.073% of platinum, 0.0073% of rhodium and 5% of cerium.

EXAMPLE 10

A catalyst J in accordance with the prior art was prepared as follows:

100 g of active alumina beads having the same textural characteristics as those described in Example 9 were impregnated with 55 cm$^3$ of a ferric nitrate solution containing 5.0 g of iron. After contacting same for 30 minutes, the beads were dried at 150° C. and then calcined in air at 400° C. for 3 hours.

They were then impregnated with 55 cm$^3$ of a solution of chloroplatinic acid and hydrated rhodium trichloride containing 73 mg of platinum and 7.3 mg of rhodium. After a contact time of 30 minutes, the beads were dried at 150° C. and then activated at 400° C. for 3 hours in a hydrogen gas stream circulating at 200 liters per hour.

The catalyst J prepared in the aforegoing manner contained, by weight relative to the support, 0.073% of platinum, 0.0073% of rhodium and 5% of iron.

EXAMPLE 11

A catalyst K in accordance with the prior art was prepared as follows:

100 g of active alumina beads such as those described in Example 9 were impregnated with 55 cm$^3$ of a cupric nitrate solution containing 5.0 g of copper. After a contacting time of 30 minutes, the beads were dried at 150° C. and then calcined in air at 400° C. for 3 hours.

The beads were then impregnated with 55 cm³ of a solution of chloroplatinic acid and hydrated rhodium trichloride containing 73 mg of platinum and 7.3 mg of rhodium. After a contact time therewith of 30 minutes, the beads were dried at 150° C. and then activated at 400° C. for 3 hours in a stream of hydrogen circulating at 300 liters per hour.

The catalyst K thereby prepared contained by weight of the support, 0.073% by weight of platinum, 0.0073% by weight of rhodium and 5% by weight of copper.

EXAMPLE 12

The following example prepared the catalyst described in Japanese Pat. No. 74/23,790, which catalyst will be designated catalyst L.

100 g of alumina beads having a specific surface area equal to 150 m²/g were immersed in 300 cm³ of an aqueous solution containing 1.25 g of ruthenium in the form of palladium nitrate, 1 g of copper in the form of cupric nitrate and 2 g of iron in the form of ferric nitrate. The excess solution was slowly evaporated and the solid obtained was dried at 100° C. for 1 hour and then calcined in air at 600° C. for 1 hour.

The catalyst L prepared contained 1.25% by weight of ruthenium, 2.5% by weight of palladium, 1% by weight of copper and 2% by weight of iron, the percentages by weight being relative to the support.

The aforegoing catalyst, representing the prior art, has two major disadvantages. First, the catalyst contains very high proportions of precious metals, which makes the catalyst essentially impractical. Second, the catalyst exhibits a very poor stability over time due to a loss of ruthenium during the catalyst's use by volatilization thereof in the form of the tetroxide. By way of example, it was found that the proportion of ruthenium in this catalyst had fallen to 0.57% by weight, relative to the alumina support, after operation in the R 17 TS car described in Example 14 below for 250 hours.

The same type of results was obtained with catalysts M and N representing the prior art and containing, respectively: 1.25% by weight of ruthenium, 2.5% by weight of palladium, 0.8% by weight of copper and 4% by weight of cerium for catalyst M, and 1.25% by weight of ruthenium, 2.5% by weight of palladium, 0.5% by weight of copper, 1% by weight of iron and 3.1% by weight of cerium for catalyst N.

EXAMPLE 13

The activities of the aforegoing catalysts A–K of Examples 1–11 were tested on an engine test bed. The tests were carried out by successively charging 1,000 cm³ of each of the catalysts into a reactor of cylindrical shape having axial circulation (internal diameter: 14 cm, thickness of the catalyst bed: 6.5 cm).

The reactor was fitted to the exhaust of 2 cylinders of an engine on the test bed by means of a device which made it possible to regulate the temperature of the gases at the inlet of the reactor to 350° C., which device was placed between the engine and the reactor.

The engine was a gasoline driven car engine comprising 4 cylinders with a capacity of 1,600 cm³ and having a compression ratio of 8.8/1. It was coupled to a hydraulic brake and ran at a stabilized speed of 3,000 rpm, thereby producing about 25 kw of power.

The fuel supply was adjusted so that the ratio of the air flow to the fuel flow at the intake was equal to the stoichiometric combustion ratio (richness equal to 1).

The flow of the exhaust gases passing over the catalyst was 46 Nm³/hour under these conditions, and the initial proportions of the main pollutants were as follows:

| | |
|---|---|
| carbon monoxide (CO) | 0.55% by volume |
| uncombusted hydrocarbons (HC) | 0.14 by volume, expressed in methane equivalents |
| nitrogen oxides (NO + NO₂) | 0.31% by volume |

The amounts of these compounds were determined both before and after the passage of the exhaust gases over the catalyst by the following analytical techniques:

| | |
|---|---|
| CO | infra-red absorption (COSMA Ruby 3,000 analyzer) |
| HC | flame ionization analysis (IPM analyzer) |
| NO + NO₂ (NO$_x$) | chemiluminescence (Thermoelectron 10 A analyzer) |

The results of the various runs are reported in Table 1. The results were obtained under equivalent temperature conditions which make it possible to differentiate clearly between the catalysts from the point of view of their low temperature performance characteristics.

TABLE 1

Activities measured on an engine test bed at 350° C. and expressed as percentage conversion of the carbon monoxide (CO), hydrocarbons (HC) and nitrogen oxides (NO$_x$).

| Example number | Catalyst reference | % of conversion measured at 350° C. | | |
|---|---|---|---|---|
| | | CO | HC | NO$_x$ |
| 1 | A | 75 | 70 | 85 |
| 2 | B | 57 | 43 | 65 |
| 3 | C | 89 | 84 | 95 |
| 4 | D | 82 | 79 | 93 |
| 5 | E | 71 | 65 | 89 |
| 6 | F | 70 | 62 | 87 |
| 7 | G | 80 | 75 | 83 |
| 8 | H | 68 | 65 | 77 |
| 9 (comparative) | I | 25 | 15 | 30 |
| 10 (comparative) | J | 10 | 9 | 13 |
| 11 (comparative) | K | 35 | 22 | 36 |

EXAMPLE 14

The activities of the various catalysts A–K of Examples 1–11 respectively were measured on a car in the American CVS-CH cycle.

The conditions utilized in the test are specified in the reference: "Federal Register, Volume 42, No. 124, June 28, 1977, pages 32,906 to 33,004, Title 40, Protection of Environment, Chapter 1, Environmental Protection Agency, Part 86, Control of air pollution for new motor vehicles and new motor vehicle engines."

The vehicle used was a RENAULT R 17 TS equipped with a prototype BOSCH-L JETRONIC electronic injection device regulated by an oxygen sensor. The inertia of the vehicle was 2,750 lbs (1,250 kg). The adjustment of the hydraulic brake simulating the road resistance was made in accordance with the American Federal Standard and corresponded to an equilibrium tractive force of 25 kg f at 80 km/hour on the chassis dynamometer used.

The base emissions emanating from the vehicle, without a catalyst muffler, were as follows:
CO: 12.3 g/mile
HC: 1.8 g/mile
$NO_x$: 2.4 g/mile An experimental catalyst muffler of cylindrical shape with radial circulation and of a volume of 1,700 cm³ was fitted to the exhaust pipe of the car about 1.7 m from the engine. The results are reported in Table 2, below.

TABLE 2

Emissions of carbon monoxide (CO), hydrocarbons (HC) and nitrogen oxides ($NO_x$), as measured on a car in the American CVS-CH cycle and expressed in grams per mile.

| Example number | Catalyst reference | Emissions after stabilization of the catalyst on the road over 50 miles | | | Emissions after aging of the catalyst on an engine test bed for 150 hours at 600° C. | | |
|---|---|---|---|---|---|---|---|
| | | CO | HC | $NO_x$ | CO | HC | $NO_x$ |
| 1 | A | 1.07 | 0.21 | 0.15 | 1.70 | 0.25 | 0.21 |
| 2 | B | 1.25 | 0.27 | 0.20 | 1.95 | 0.35 | 0.35 |
| 3 | C | 0.86 | 0.13 | 0.06 | 1.65 | 0.17 | 0.11 |
| 4 | D | 0.95 | 0.14 | 0.07 | 1.80 | 0.20 | 0.25 |
| 5 | E | 1.15 | 0.23 | 0.15 | 1.77 | 0.30 | 0.27 |
| 6 | F | 1.15 | 0.25 | 0.15 | 1.86 | 0.29 | 0.25 |
| 7 | G | 1.02 | 0.19 | 0.17 | 1.77 | 0.22 | 0.30 |
| 8 | H | 1.17 | 0.28 | 0.17 | 1.90 | 0.30 | 0.25 |
| 9 (comparative) | I | 1.43 | 0.31 | 0.30 | 3.12 | 0.46 | 0.72 |
| 10 (comparative) | J | 1.76 | 0.43 | 0.38 | 4.43 | 0.77 | 1.62 |
| 11 (comparative) | K | 1.36 | 0.27 | 0.26 | 2.86 | 0.68 | 0.63 |

The results shown in Tables 1 and 2 clearly demonstrate the superiority of catalysts A, B, C, D, E, F, G, and H, which are in accordance with the present invention, over the prior art catalysts I, J and K. The superiority can be seen both with regard to initial activity of the catalyst and stability of catalyst activity over time.

Although the invention has been described with various preferred embodiments, it is to be understood that variations and modifications may be resorted to as will be apparent to those skilled in the art. Such variations and modifications are to be considered within the purview and the scope of the claims appended hereto.

What is claimed is:

1. A catalyst useful for treating the exhaust gases of internal combustion engines comprising a support and an active phase deposited thereon, which activate phase comprises copper, either cerium or iron, at least one metal selected from the group consisting of platinum and palladium, and at least one metal selected from the group consisting of iridium and rhodium.

2. The catalyst of claim 1 wherein the amount of platinum and palladium present ranges from about 0.04 to about 0.5 weight percent of the support, the amount of iridium and rhodium present ranges from about 0.002 to about 0.1 weight percent of the support, the amount of cerium or iron present ranges from about 0.1 to about 10 weight percent of the support, and the amount of copper present ranges from about 0.1 to about 4 weight percent of the support.

3. The catalyst of claim 1 or 2 wherein the amount of platinum and palladium present ranges from about 0.05 to about 0.15 percent by weight, the amount of iridium and rhodium present ranges from about 0.005 to about 0.02 percent by weight, the amount of cerium or iron present ranges from about 0.3 to about 4.5 percent by weight, and the amount of copper present is in the range of from about 0.1 to about 2 percent by weight.

4. The catalyst of claim 1 or 2 wherein the total amount of copper, and iron or cerium present is less than 14 percent by weight relative to the support.

5. The catalyst of claim 4 wherein the total amount of copper, and iron or cerium present is less than 4.9 percent by weight relative to the support.

6. The catalyst of claim 1 or 2 wherein the support comprises a refractory oxide.

7. The catalyst of claim 6 wherein the support is comprised of silica, alumina, alumino-silicates or a mixture of oxides.

8. The catalyst of claim 7 wherein the mixture of oxides comprises alumina and at least one of silica, zirconium oxide, cerium oxide and titanium oxide.

9. The catalyst of claim 6 wherein the support comprises a metal or ceramic substrate coated with a refractory oxide.

10. The catalyst of claim 9 wherein the substrate is of the form of an inert and rigid honeycomb structure.

11. The catalyst of claim 6 wherein the support comprises alumina particles having a specific surface area of between 25 and 250 m²/g, a total pore volume between 0.5 and 2 cm³/g, and a macroporosity such that the pore volume of pores having a diameter greater than 1000 Å is between about 0.05 and 0.6 cm³/g.

12. The catalyst of claim 11 wherein the specific surface area is between 70 and 150 m²/g, the total pore volume is between 0.8 and 1.7 cm³/g and the macroporosity is between about 0.2 and 0.5 cm³/g.

13. The catalyst of claim 10 wherein the oxide coating is of aluminum oxide.

14. The catalyst of claim 1 or 2 wherein the active phase further comprises at least one of the metals selected from the group consisting of tungsten, nickel, manganese, tin, germanium, cobalt, uranium and rhenium, with the total amount of said metals present being between 0.2 and 5 percent by weight of the support.

15. A catalyst useful for treating exhaust gases of internal combustion engines comprising (i) a support comprised of alumina particles having a specific surface area of between 25 and 250 m²/g, a total pore volume between about 0.5 and 2 cm³/g and a macroporosity such that the pore volume of pores having a diameter greater than 1000 Å is between about 0.05 and 0.6 cm³/g, and (ii) an active phase deposited thereon which comprises copper in an amount ranging from about 0.1 to about 4 weight percent of the support, either cerium or iron with the total amount of cerium or iron present ranging from about 0.1 to about 10 weight percent of the support, at least one metal selected from the group consisting of platinum and palladium with the total amount of said metals being in the range of from about 0.04 to about 5 weight percent of the support, and at least one metal selected from the group consisting of iridium and rhodium with the total amount of said metals present being in the range of from about 0.002 to about 0.1 weight percent of the support.

16. A catalyst useful for treating exhaust gases of internal combustion engines comprising (i) a support comprised of a metal or ceramic substrate coated with alumina, and (ii) an active phase deposited thereon which comprises copper in an amount ranging from about 0.1 to about 4 weight percent of the support, either cerium or iron with the total amount of cerium or iron present ranging from about 0.1 to about 10 weight percent of the support, at least one metal selected from the group consisting of platinum and palladium with the total amount of said metals present being in the range of from about 0.04 to about 5 weight percent of the support, and at least one metal selected from the group consisting of iridium and rhodium with the total amount of said metals present being in the range of from about 0.002 to about 0.1 weight percent of the support.

17. A process for the treatment of exhaust gases of internal combustion engines which comprises contacting the gases with the catalyst of claims 1, 15 or 16.

* * * * *